June 12, 1962 L. D. STATHAM 3,038,344
COMBINED ANGULAR AND LINEAR ACCELEROMETER
Filed Jan. 23, 1961 6 Sheets-Sheet 1

FIG. 1.

INVENTOR,
LOUIS D. STATHAM
BY Philip Subrow
ATTORNEY.

June 12, 1962  L. D. STATHAM  3,038,344
COMBINED ANGULAR AND LINEAR ACCELEROMETER
Filed Jan. 23, 1961  6 Sheets-Sheet 2

FIG. 2.

INVENTOR,
LOUIS D. STATHAM
BY Philip Subkow
ATTORNEY.

June 12, 1962 L. D. STATHAM 3,038,344
COMBINED ANGULAR AND LINEAR ACCELEROMETER
Filed Jan. 23, 1961 6 Sheets-Sheet 5

INVENTOR.
LOUIS D. STATHAM
BY Philip Subkow
ATTORNEY

United States Patent Office 3,038,344
Patented June 12, 1962

3,038,344
COMBINED ANGULAR AND LINEAR
ACCELEROMETER
Louis D. Statham, Beverly Hills, Calif., assignor to Statham Instruments, Inc., Los Angeles, Calif., a corporation of California
Filed Jan. 23, 1961, Ser. No. 84,099
15 Claims. (Cl. 73—504)

This application is a continuation-in-part of my applications, Serial No. 431,764, filed May 24, 1954, now Patent No. 2,778,624; Serial No. 328,416, filed December 29, 1952, now Patent No. 2,778,623; Serial No. 241,539, filed August 13, 1951, now Patent No. 2,778,905; Serial No. 627,926, filed December 12, 1956; and Serial No. 627,927, filed December 12, 1956.

This invention relates to a motion responsive device for indicating and recording the magnitude and nature of motions of an object in space. It belongs to the general class of motion sensing devices such as accelerometers.

Ordinarily, accelerometers are designed to measure either angular or linear acceleration. However, in many instances, it is desirable to measure or sense the combined effects of both angular and linear acceleration. One application of this type is in aircraft, where an accelerometer is required for sensing the magnitude of the total acceleration, both angular and linear, to control an autopilot. In devices of this nature there need be no discrimination as between the individual magnitude of the angular and linear acceleration forces, the sensing of the sum of such forces only being necessary.

It is accordingly an object of the invention to provide an accelerometer to sense angular and linear acceleration with reference to the sum thereof. A particular object of this invention is to redesign the angular accelerometer shown and described in my above noted applications into an accelerometer which will sense the sum total angular and linear acceleration.

The angular accelerometer of my above noted applications, particularly Serial No. 431,764 (Patent 2,778,624) and Serial No. 328,416 (Patent No. 2,778,623), has a pivoted paddle which is balanced on both sides of a restraining pivot mounting, and a strain wire transducer is connected between the paddle and fixed members on the frame. Such accelerometer is housed in a container and employs a liquid mass as the effective inertial mass with the paddle immersed in the liquid and mounted for motion relative to the liquid in the container. The relative motion of the liquid and the container wall will cause the paddle to be displaced, as a result of a difference in pressure on both sides of the paddle. The paddle is thus displaced in the direction of the flow of liquid relative to the container. By mounting the paddle so that it is movable relative to the container body, the relative displacement of the container and liquid will produce a thrust on the paddle resulting from the relative displacement of the liquid and the container for the liquid.

I have found that the accelerometer of my copending applications can be made sensitive to linear as well as to angular acceleration by slightly unbalancing the paddle. By so unbalancing the opposite ends of the movable member or paddle, the accelerometer is made not only sensitive to angular acceleration, but is also thereby rendered sensitive to linear acceleration. Such unbalancing can be accomplished by making the opposite portions of the movable member or paddle of slightly unequal mass, e.g., by making one end of the paddle slightly larger than the opposite end. Preferably, however, I achieve this purpose by adding a little more weight to one end of the paddle than to its opposite end, i.e., by providing one end of the hollow paddle of the accelerometer of my above patents and applications with a closure screw having a greater weight or mass than the closure screw at the opposite end of the paddle.

However, the amount of weight or mass added to one side of the paddle to unbalance it should be small enough so that the stiffness of the restraining pivot mounting for the paddle and the strain wires is sufficient to prevent deflection of the paddle by this added weight in the rest or zero position of the instrument.

The above and other features and objects of my invention will be further described in connection with the accompanying drawings, wherein.

Figure 1:
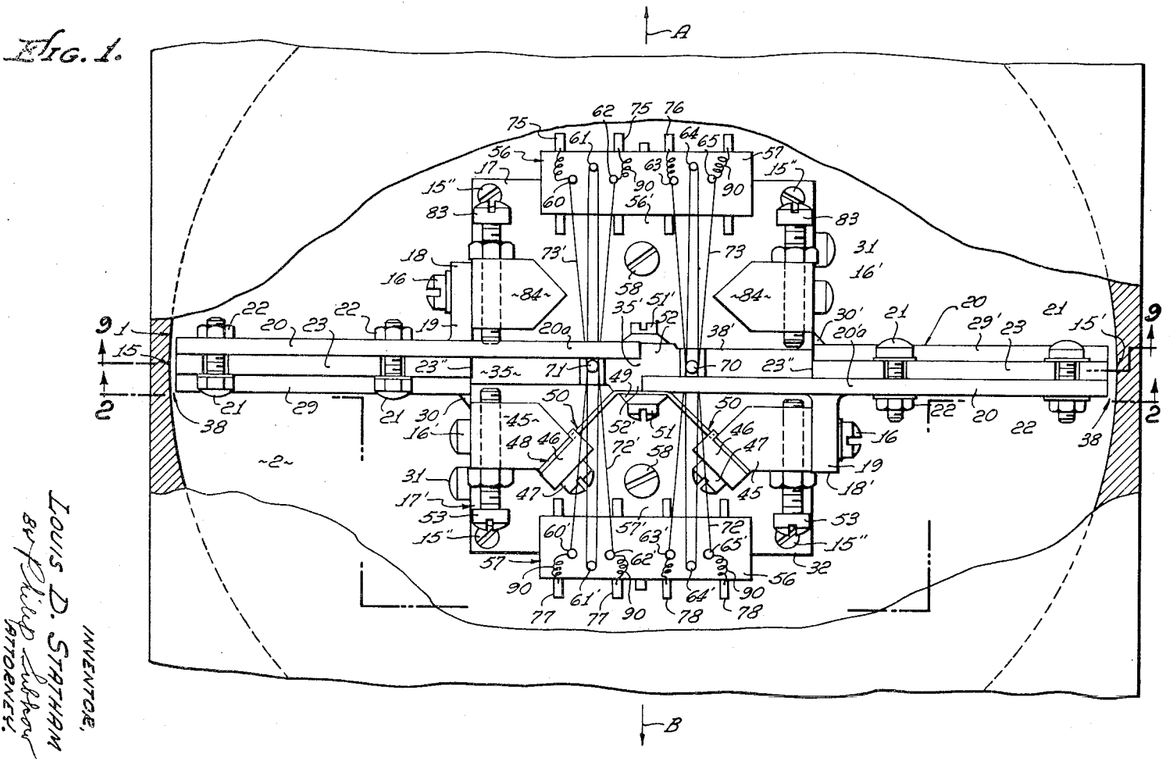
FIG. 1 is a plan view of a preferred embodiment of my invention, with parts broken away and parts in section for clarity.
Figure 2:
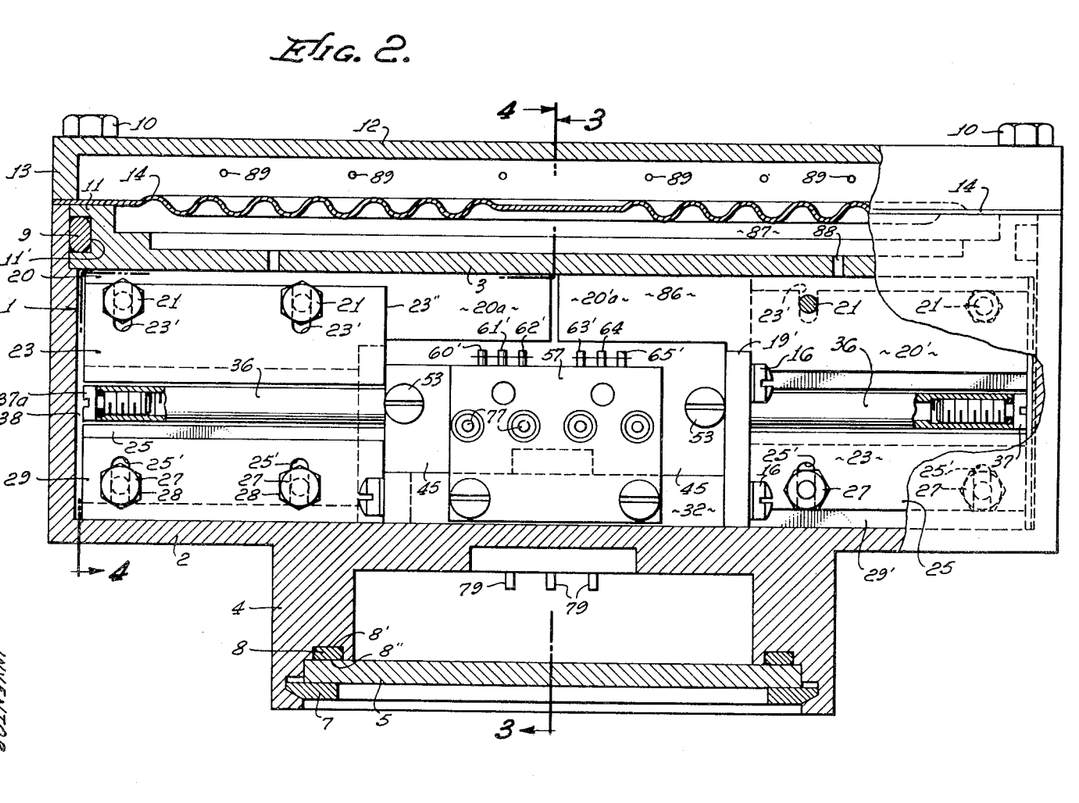
FIG. 2 is a vertical broken section taken on line 2—2 of FIG. 1.

Referring particularly to FIGS. 1 and 2, the container 1 is shown as a cylinder, but may be of any shape provided that it is a closed container. The container is closed by a bottom 2 and a top 3. The bottom 2 carries a depending circular flange 4, to the lower end of which is secured a removable cover 5, held in place by snap ring 7 maintained in a suitable groove in flange 4. An O ring 8 is positioned in a groove 8' located in a horizontal shoulder 8" intermediate the ends of flange 4. The top 3 is held in position on the upper wall of the case 1, with the lower end portion of member 3 resting on a horizontal shoulder 4' formed by a recess in the wall. Secured to top 3 by means of bolts 10 passing through an outer upwardly extending flange 11 of the top 3, is a cover 12 having a depending flange 13. Positioned between the lower end of flange 13 and the top of flange 11 is a flexible diaphragm 14 held in place by the bolts 10. Flange 11 has an annular recess 11' therein to accommodate an O ring 9 for sealing purposes.

Figure 4:
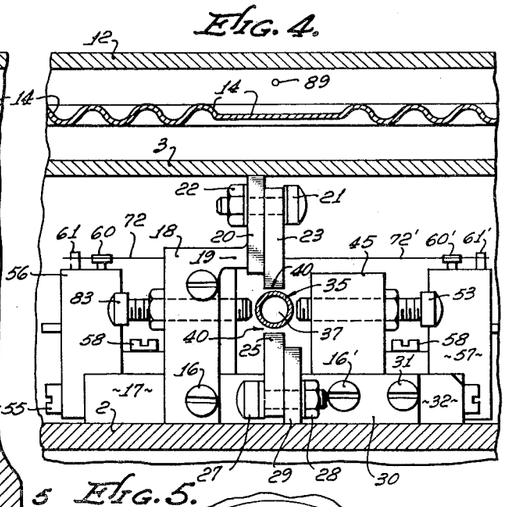
FIG. 4 is an irregular section on line 4—4 of FIG. 2.

As seen in FIGS. 1, 2 and 4, a square bracket member 17' comprising half bracket portions 17 and 32 is attached to the base 2 by means of screws 15" located at the corners of member 17'.

Figures 3, 6, 7:
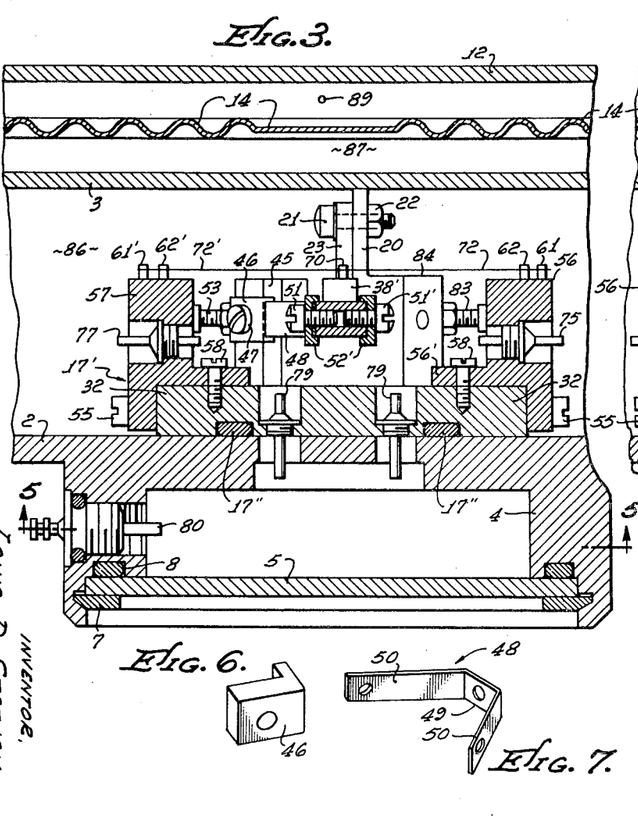
FIG. 3 is a vertical section on line 3—3 of FIG. 2.
FIG. 6 is a perspective view of an element of the invention device.
FIG. 7 is a perspective view of another element of the device.

An O ring seal 17" (see FIG. 3) is disposed in an annular groove in the lower surface of member 17' in contact with the bottom 2. Secured by means of bolts 16 to opposite sides of bracket portions 17 and 32, respectively, are a pair of supports 18 and 18', each having a horizontally extending upper portion 19 and 19'. Upwardly extending plates 20 and 20' are integrally secured to the ends of each of portions 19 and 19' of supports 18 and 18', each of such plates extending substantially into contact with top 3 and extending outwardly across the container, the outer edges of the plates 20 and 20' being spaced a short distance from the adjacent container wall sections 15 and 15'.

Figure 9:
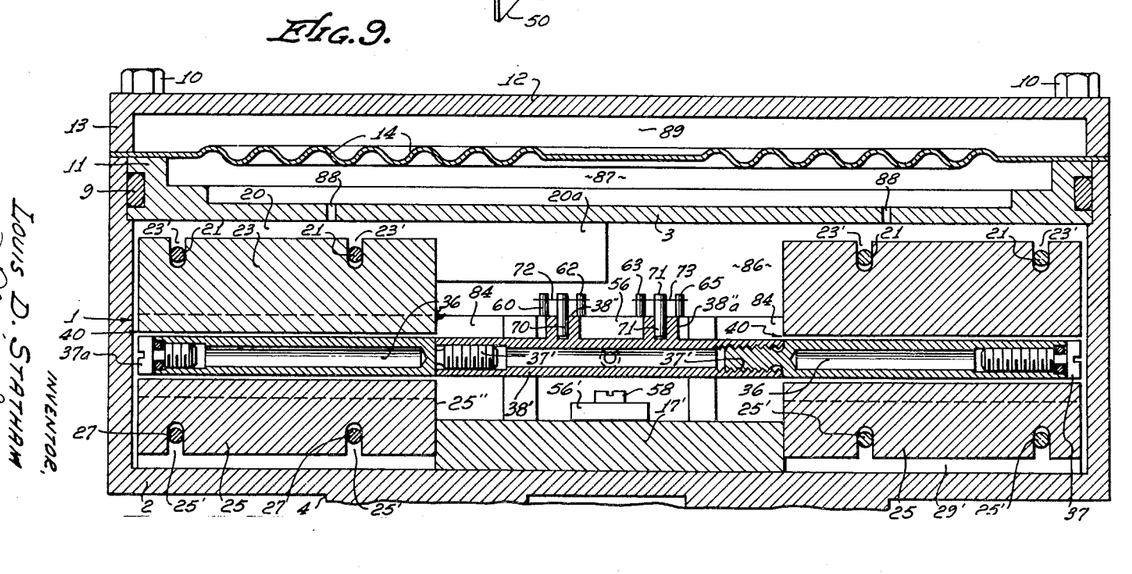
FIG. 9 is a section taken on line 9—9 of FIG. 1.

As is seen in FIG. 2, plates 20 and 20' extend inwardly almost to the center of the container, their inner edges being located closely adjacent each other and their inner portions 20a and 20'a being reduced in size to accommodate the strain wire transducer structure as shown in FIG. 9 and described below. Secured to each of plates 20 and 20' by bolts 21 and nuts 22 is a baffle 23, the lower ends of which extend somewhat below the lower ends of plates 20 and 20'. Bolts 21 pass through slots 23' in baffles 23, the slots being provided for vertical adjustment of the baffles to vary the distance between the lower edges of the baffles and the paddle 35 described below. Baffles 23 extend in alignment with each other along a diameter of the container 1 and their outer ends are located adjacent the respective opposite ends of plates 20 and 20', the outer edges of the baffles and plates 20 and 20' being spaced a short distance from the adjacent container walls. The inner edges 23" of baffles 23 are located directly above the opposite side edges of bracket member 17'.

A pair of lower baffles 25 of approximately the same length as baffles 23 are positioned directly below and in alignment with the upper baffles 23, the upper longitudinal edges of baffles 25 being spaced from and parallel to the adjacent lower longitudinal edges of baffles 23. The outer edges of baffles 25 are also spaced a short distance from the container wall sections 15 and 15', although if desired, the outer edges of either or both baffles 23 and 25, or of either or both plates 20 and 20' may touch the adjacent wall sections. The inner ends 25" of baffles 25 abut against opposite sides of bracket member 17' (see FIG. 9). Baffles 25 are secured by means of bolts 27 and nuts 28 to plates 29 and 29' located at opposite sides of container 1 and in vertical alignment with plates 20' and 20, respectively. Bolts 27 pass through slots 25' in baffles 25 for vertical adjustment of the baffles. Plates 29 and 29' are attached to a pair of opposite support members 30 and 30', respectively, which support members are in turn respectively secured by means of bolts 31 to opposite sides of bracket portions 32 and 17.

Positioned in the space between and parallel to the adjacent longitudinal edges of baffles 23 and 25 (see FIGS. 2, 4, 8 and 9), is a paddle 35 of low mass in the aforementioned liquid, the paddle extending diametrically of the cylindrical container. The paddle is generally in the form of an elongated hollow member with the ends sealed. The paddle of the instant embodiment is shown as being formed of two aligned hollow cylinders 36 with their outer ends sealed by threaded caps 37 and 37a. It will be seen that the threaded cap 37 is made somewhat longer than cap 37a. The inner adjacent ends of reduced diameter of cylinders 36 are each threaded as at 37' into opposite ends of a central hollow oblong paddle mount 38'. Hence the paddle is unbalanced by the slight difference in weight between the longer and heavier cap 37 as compared to the shorter and lighter threaded cap 37a. A paddle of any structural shape or configuration may be employed according to the invention, so long as the mass of the paddle in the liquid is maintained small but unbalanced according to the invention. Even with the added weight on one side of the paddle provided by the difference in weight between caps 37 and 37a, the paddle may have very little apparent mass when submerged in the liquid, i.e., the paddle is almost completely buoyant when employing a balanced paddle as in my above noted copending applications, and the small weight added to one side of the paddle according to the instant invention only slightly reduces this buoyancy. The paddle is structurally rigid and may be constructed of any material conferring the foregoing mass characteristics on the paddle, such as magnesium, aluminum, plastic and the like.

The outer edges of the paddle 35 may touch the adjacent wall sections 15 and 15' so long as the paddle is free to rotate over the wall. However, this will reduce the resolution of the instrument, and it will not respond to as low values of acceleration change as when such end gaps are provided. In the preferred embodiment of my invention both ends 37 and 37a of the paddle are spaced from the wall sections 15 and 15' to give orifices 38 of size to produce the desired damping effect.

Although some damping is obtained by reason of the orifices 38 between the ends of the paddle and the adjacent wall sections of the container as described above, an additional damping effect is obtained along with a high natural frequency according to the instant improvements by reason of the parallel slots 40 formed between the paddle and the adjacent edges of baffles 23 and 25. The spacing between the substantially buoyant paddle and the two stationary baffles is important because as these gaps are increased in areas, the damping ratio at any given temperature for any given oil in the instrument will increase in value.

The paddle 35 is mounted on a leaf spring type Cardan suspension so as to pivot on the central axis of the container 1. The pivoted mounting shown in FIG. 1 consists of angularly placed lugs 45 mounted on bracket 32 by means of bolts 16 and 16'. Secured to the angular lugs by means of clamps 46 (see FIG. 6) and bolts 47 passing through them is a V-shaped spring 48 (see FIG. 7), having a planar base 49, the angles formed by the legs 50 of the V and the base being equal. The base of the spring is connected by a screw 51 to the central hub 52 of the paddle 35 so as to put the axis of the paddle on a line passing through the diameter of the cylindrical container. The paddle 35 can thus pivot about the central axis of the container on the spring 48. The angular motion of the paddle is limited by means of two limit motion stop screws 53 which may be adjusted on the lugs 45.

The hub 52 of the paddle has a symmetrical base 52' on opposite sides of the hub, and a screw 51' of the same weight and contour as screw 51 is fastened to the opposite side of the hub. This hub structure makes the paddle completely symmetrical except for the use of the different size threaded caps 37 and 37a in the ends of the paddle, that is, the paddle is unbalanced in weight only with respect to the difference in weight between members 37 and 37a, and is otherwise symmetrical in form about a longitudinal axis through the central axis of the cylindical paddle and also about an axis perpendicular thereto and passing through the paddle pivot point 35' which is substantially at the intersection of the legs 50 of spring 48. If desired, an additional spring such as 48 may be connected to the hub 52 of the paddle directly opposite and in the same manner as spring 48, and suspended in a similar manner with the legs of the additional spring secured to lugs 84 on bracket 17.

Connected to opposite ends respectively of brackets 17 and 32 by means of screws 55 are a pair of blocks 56 and 57. Blocks 56 and 57 have longitudinally extending brackets 56' and 57' integrally connected to the lower portions thereof, these brackets resting on and being secured to the square bracket 17' by means of screws 58. Block 56 carries two sets of pins, one set being positioned adjacent the other. One set of such pins consists of three pins, 60, 61 and 62, pin 61 being positioned between but farther from paddle 35 than pins 60 and 62. The other set of pins also consists of three pins 63, 64 and 65 located with respect to each other similarly to pins 60, 61 and 62, intermediate pin 64 being positioned directly opposite intermediate pin 61, i.e., on a line parallel to the axis of paddle 35. Block 57 also carries two adjacent sets of pins, one set being composed of three pins, 60', 61' and 62', situated similarly to and directly opposite (i.e., on a line normal to the axis of paddle 35) pins 60, 61 and 62 on block 56, and the other set consisting of pins 63', 64' and 65' located similarly to and directly opposite pins 63, 64 and 65 on block 56. Positioned on a lug 38" formed on paddle mount 38' (see FIG. 9) in a plane normal to the axis of the paddle and passing through pins 61 and 61' is a pin 70, and also located on lug 38"a on the paddle mount in a plane normal to the axis of the paddle and passing through pins 64 and 64' is a pin 71.

A strain sensitive wire 72 is wound in tension between pins 61 and 70 in a loop, one end of the loop terminating at pin 60 and the other end terminating at pin 62. A strain wire 72' is also wound in tension between pins 61' and 70 in a loop, one end of the loop terminating at pin 60' and the other end terminating at pin 62'. In the same manner a strain wire 73 is wound in tension in a loop between pins 64 and 71, the opposite ends of the wire terminating at pins 63 and 65; and a strain wire 73' is wound in tension in a loop between pins 64' and 71, the opposite ends of the wire terminating at pins 63' and 65'. All the pins are electrically insulated and the wires are out of contact with the frame and with each other. The ends of each of the four wires 72, 73, 72' and 73' are respectively connected by conductors such as 90, to four pairs of terminals 75, 76, 77 and 78 located in blocks 56 and 57, which terminals in turn are connected by conductors (not shown) to terminals 79 (see FIG. 3) extending through bottom 2 of the device. The latter terminals are connected in a conventional Wheatstone bridge arrangement to the four outer terminals 80 located on the periphery of flange 4.

It will be noted that in the zero position of the paddle illustrated in FIG. 1, there is no measurable deflection of the paddle. Thus, the stiffness of the pivotal spring mounting 48 for the paddle 35 and the stiffness of the restraint produced by the strain wires is sufficient to overcome the unbalancing effect of the use of the slightly larger cap 37 on one side of the paddle. The added weight provided by the difference in weight between caps 37 and 37a is sufficiently small so that the constraint of spring 48 and of the strain wires adequately offset the paddle deflecting tendency of such added weight.

It will be seen that angular motion of the paddle 35, e.g., in a clockwise direction as viewed in FIG. 1, will cause pin 70 to move toward block 56 and away from block 57, and will cause pin 71 to move toward block 57 and away from block 56. This action relaxes the tension in wires 72 and 73', and increases the tension in wires 72' and 73, since the pins on blocks 56 are stationary. If the mass of liquid in the container causes the paddle to move counterclockwise, wires 72 and 73' are increasingly tensioned and the tension in wires 72' and 73 is relaxed. Suitable motion limiting stop screws 83 pass through lugs 84 secured to the bracket 17 by screws 16 and 16'.

Further, it will be noted that should there be a linear acceleration in the direction of arrow A in FIG. 1, paddle 35 will tend to rotate in a clockwise direction, since the screw 37a at the right end of the paddle is heavier than screw 37 at the left end of the paddle, and this unbalanced condition of the paddle produces a moment on the paddle about its center of rotation. Clockwise rotation of paddle 35 causes strain wires 72' and 73 to be tensioned, and wires 72 and 73' to relax to thus change the output of the bridge circuit. When the instrument is accelerated linearly in the direction indicated by arrow B in FIG. 1, the above noted unbalanced condition of the paddle 35 causes it to be rotated counterclockwise, to increase the tension in wires 72 and 73' and relax wires 72' and 73, thereby changing the output of the bridge to indicate such acceleration.

It will be observed that both angular and linear accelerations may take place simultaneously and the net result will be sensed by the bridge. Thus, for example, if an angular acceleration is imparted to the instrument such as to cause paddle 35 to rotate clockwise and at the same time the instrument is linearly accelerated in the direction A as seen in FIG. 1 to increase the magnitude of clockwise rotation of the paddle, the magnitude of the total clockwise movement of the paddle corresponding to the sum of the above angular and linear accelerations will be sensed by the bridge to produce an increased output therefrom corresponding to the increased strain on the wires resulting from the sum of such accelerations. Should an angular acceleration take place such as to rotate the paddle counterclockwise, and at the same time there is a linear acceleration in the direction of arrow B in FIG. 1, producing further counterclockwise rotation of the paddle, the sum of such movements corresponding to the sum of the accelerations will be sensed by the correspondingly increased output from the bridge.

Also, should angular acceleration take place in a direction to rotate the paddle clockwise, with linear rotation simultaneously occurring in the direction of arrow B, which tends to rotate the paddle counterclockwise, these tendencies toward movement of the paddle in opposite directions will tend to offset each other and the difference between these acceleration forces, or the net acceleration, will be sensed by the bridge. A similar result takes place on angular acceleration so as to rotate the paddle counterclockwise with simultaneous linear acceleration in the direction indicated by arrow A in FIG. 1, causing an opposing clockwise rotation of the paddle.

It will thus be apparent that the instrument of the instant invention is designed to sense the arithmetic sum of the angular and linear accelerations imparted to the instrument, the instrument being of particular value in sensing the sum of a positive angular and a positive linear acceleration, that is, when both these acceleration forces cause the paddle to rotate in the same direction.

Figure 5:
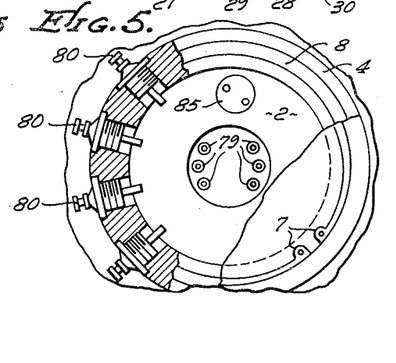
FIG. 5 is a view taken on line 5—5 of FIG. 3, looking in the direction of the arrows.
Figure 8:
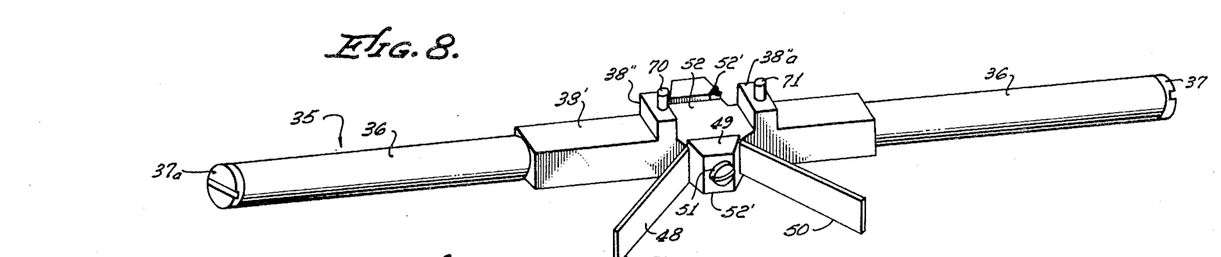
FIG. 8 is an isometric view of the paddle assembly of the device.

The case or container 1 may be completely filled with liquid through a fill hole stoppered by a screw 85 (see FIG. 5) and the fluid enters and fills the chamber 86 between the bottom and top members 2 and 3 of the device, and passes into and fills the chamber 87 underneath the diaphragm 14 through ports 88. Suitable air breather holes 89 are provided in the flange 13.

The liquid employed may be any liquid but, I desire to choose a fluid having a low viscosity temperature susceptibility, even though it be of low density, particularly if it has also a low value of its cubical coefficient of expansion, rather than to choose a liquid of high viscosity temprature susceptibility and high density, particularly if it also has a high value for its cubical coefficient of expansion. This leads me to select as my preferred liquid an oil and preferably the synthetic silicone polymers which have flat viscosity temperature lines on the ASTM chart. Thus, by a proper selection of the magnitude of the design parameters of my instrument as described above, I may select the desired damping ratio which will remain sensibly constant over a wide range of viscosities of the damping oil.

A higher natural frequency for a given range can be obtained in the device described herein by increasing the diameter of the liquid rotor.

While I have disclosed an electrical resistance strain gage type transducer as the motion-sensing device, it will be understood by those skilled in the art that any other suitably designed transducer, such as an inductive type transducer illustrated in my copending application, Serial No. 328,416, now Patent No. 2,778,905, or other equivalent devices may be employed, provided that the pivoted spring suspension alone has sufficient stiffness to prevent measurable deflection of the paddle.

Figure 10:
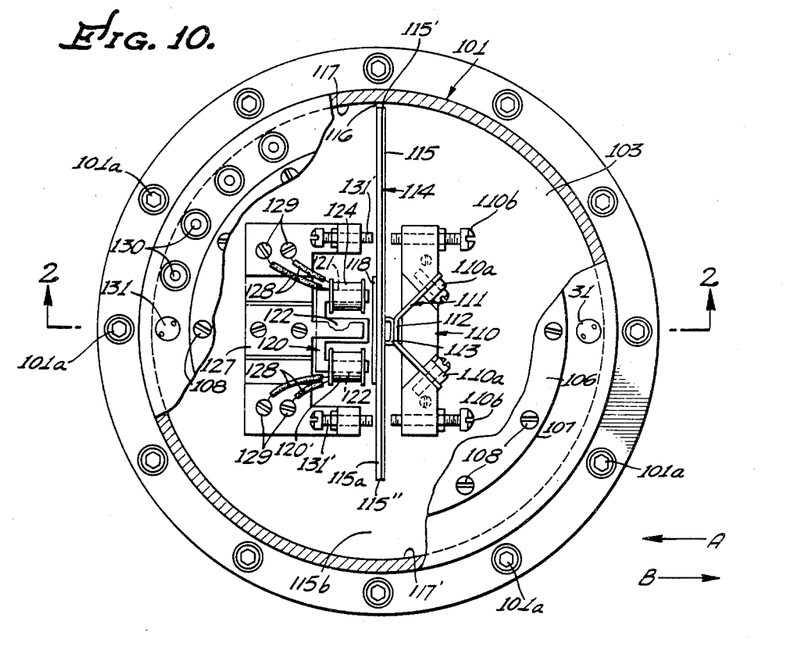
FIG. 10 is a plan view with parts broken away and parts in section of another form of my invention.
Figure 11:
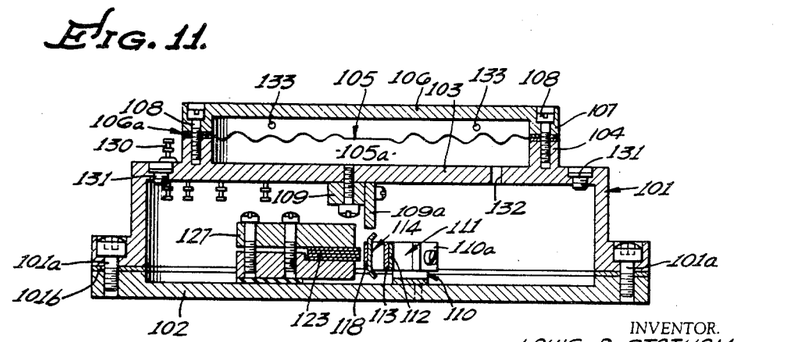
FIG. 11 is a section taken on line 8—8 of FIG. 10.

The container 101 of FIGS. 10 and 11 is shown as cylinder, but may be of any shape provided that it is a closed container and has opposing cylindrical wall surfaces opposite the paddle ends or edges, as will be described below. The container is closed by a bottom 102 suitably mounted in the container by studs 101a and gasket 101b, as shown, and the container is closed by the top 103. The top 103 carries an upstanding circular flange 104 on which is set the circular flange 107 depending from the cover 106. The flange 104 is connected to flange 107 by suitable studs 108, as shown. A flexible diaphragm 105 is clamped at its edges between the flanges 103 and 107 with suitable sealing gaskets 106a and extends across the entire area of the chamber 105a. Depending from the lower face of the top 103 is a bracket 109 carrying a baffle plate 109a abutting the underneath face of the top 103 and extending diametrically from wall section 117 to the wall section 117' of the container. Paddle 114 is placed directly underneath the baffle 109a, spaced therefrom, and extends diametrically of the cylindrical container. The paddle is in the shape of a channel member, for stiffness.

It will be seen that one end 115 of the paddle on one side of the central paddle mounting 112 is longer than the opposite end 115a, so that the outer edge 115' of the paddle is positioned close to but spaced from the adjacent wall 117 of the container, and the opposite outer edge 115" of the paddle is positioned a substantial distance from the opposite wall 117' of the container. For purposes of the invention, the shorter cut-back portion 115a of the paddle should be sufficiently spaced from the adjacent wall section 117' so that the velocity of the fluid passing through the space 115b is substantially less than the velocity of the liquid passing through the narrow orifice 116 between the opposite end 115' of the paddle and its adjacent wall section 117, on acceleration of the instrument as described more fully below. In this manner, it will be seen that the paddle 114 is unbalanced by the difference in mass between the long end 115 and the short end 115a of the paddle.

If desired, the edge 115' of the paddle may touch the adjacent wall section 117 but be free to rotate over the wall. However, by spacing edge 115' of the long end 115 of the paddle a short distance from the adjacent wall and from the baffle, the additional damping characteristics noted above may be obtained. Hence, in the preferred embodiment, edge 115' is spaced from the wall section 117 to give an orifice 116 of size to give the damping effect noted above.

The paddle is mounted so as to pivot on the central axis of the container 101. The pivoted mounting shown in FIGS. 10 and 11 consists of a bracket 110 having angularly placed lugs 110a. The bracket is mounted on the base 102. Clamped to the angular lugs is a V-shaped spring 111 having a planar base 112, the angles formed by the legs of the V and the base being equal. The base of the V is connected by soldering or any other suitable means to a U bracket 113 which is likewise connected to the channel face of the paddle 114 so as to put the central plane of the paddle face on the diametric plane of the cylindrical container. The flanges of the channel clear the bottom of the baffle 109a and the bottom 102 so that the paddle can pivot about the central axis of the container on the springs 111. The angular motion of the paddle is limited by means of two limit motion stop screws 110b which may be adjusted on the bracket 110.

Mounted on the opposite face of the channel 114 is an armature 118 of a material having suitable magnetic permeability as, for example, an iron armature. The armature is in the form of a plate which extends across the axis of rotation of the paddle 114.

Mounted in front of the armature on a bracket 127 is an E-shaped iron core 120 having pole pieces 121, 122 and 123. The bracket is so positioned that the pole pieces are spaced from the armature 118. The core legs 121 and 122 have positioned thereon coils 124 and 120' connected by conductors 128 to terminals 129 in turn connected by conductors (not shown) to terminals 130 which extend through the top 103. Suitable motion limiting stop screws 131' pass through the bracket 127, as shown in FIG. 10.

The case 101 may be filled with liquid through fill holes stoppered by screws 131, and the fluid enters and fills the chamber 105a underneath the diaphragm through ports 132. Suitable air breather holes 133 are provided in the flange 107.

The liquid employed may be any liquid but, preferably, I select one having a high density and low viscosity or a high viscosity and low density to give the desired damping effect. While I may choose from a wide variety of liquids, I prefer to employ a liquid having a low viscosity temperature susceptibility and preferably also one having a low value of temperature coefficient of cubical expansion. A particularly useful liquid is the synthetic silicone polymers which have flat viscosity temperature lines on the A.S.T.M. chart.

While I do not wish to be bound by any dimensions of my device or characteristics of the liquid employed therein, I may employ, for the purpose of illustration, a paddle so designed as to give an orifice 116 at the wall 117 having a height of about ½" and a spacing from the wall of 0.050", and employ a silicone oil having a viscosity of 200 centipoises at 70° F. and a density of 1.

It will be observed that rotation of the container 101, upon about the central axis of the container, causes the paddle to deflect, causing the armature 118 to approach one of the pole pieces, for example 122, and depart from the pole piece 121, changing the air gap at the pole faces. This increases the reluctance in the magnetic path about the coil 124 and decreases the reluctance in the magnetic path about coil 120'. The resultant change in the inductance of the two coils may be sensed or measured by any conventional means and related to the angular motion of the paddle, as will be understood by those skilled in this art.

Further, it will be noted that should there be a linear acceleration in the direction of arrow A in FIG. 10, paddle 114 will tend to rotate clockwise due to the unbalance of the paddle, and this unbalanced condition of the paddle produces a moment on the paddle about its center of rotation. Such clockwise rotation of the paddle causes the armature 118 to approach pole piece 122 and depart from pole piece 121, to change the air gap between the pole pieces and registered by the sensing means, corresponding to this angular motion of the paddle.

If at the same time, there is an angular acceleration of the instrument also causing clockwise motion of the paddle 114, the magnitude of the total clockwise movement of the paddle corresponding to the sum of the above angular and linear accelerations will be sensed by the sensing means to which the coils 124 and 120' are connected, corresponding to the increased motion of the paddle resulting from the sum of such accelerations. Should an angular acceleration take place such as to rotate the paddle counterclockwise, and at the same time there is a linear acceleration in the direction indicated by arrow B in FIG. 10, producing further counterclockwise rotation of the paddle, the sum of such movements corresponding to the sum of the accelerations will be sensed by the motion sensing means.

Also, should angular acceleration take place in a direction to rotate the paddle clockwise, with linear acceleration simultaneously occurring in the direction of arrow B, which tends to rotate the paddle counterclockwise, these tendencies toward movement of the paddle in opposite directions will tend to offset each other and the difference between these acceleration forces, or the net acceleration, will be sensed by the sensing or measuring means. A similar result takes place on angular acceleration so as to rotate the paddle counterclockwise with simultaneous linear acceleration in the direction indicated by arrow A in FIG. 10, causing an opposing clockwise rotation of the paddle.

It will thus be apparent that the instrument of the instant invention is designed to sense the arithmetic sum of the angular and linear accelerations imparted to the instrument, the instrument being of particular value in sensing the sum of a positive angular and a positive linear acceleration, that is, when both these acceleration forces cause the paddle to rotate in the same direction.

While the instrument of the invention is particularly useful for sensing combined angular and linear accelerations, it will be understood, of course, that the instrument will sense an angular or a linear acceleration separately, that is, the instrument is effective in sensing an angular acceleration, a linear acceleration, or the total acceleration where both types occur simultaneously.

Figure 12:
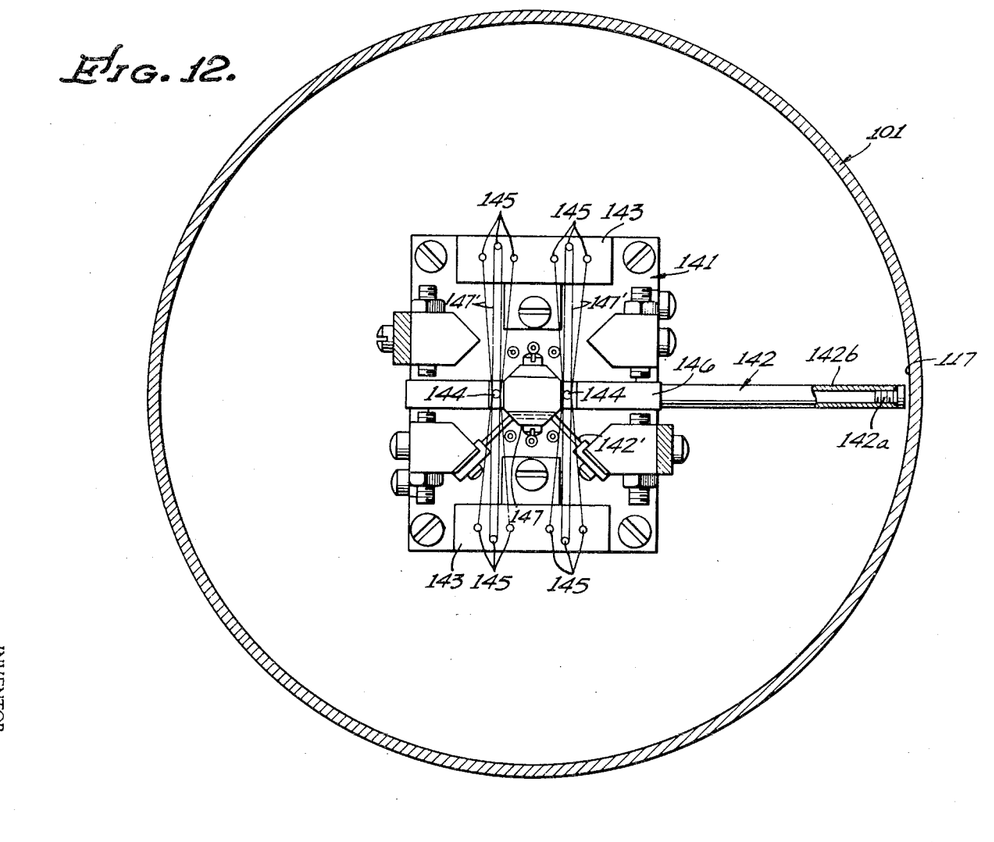
FIG. 12 is another form of my invention.

In FIG. 12 is shown a modification of the device of FIG. 10. Centrally positioned in case 101 is an island 141 on which is mounted a paddle 142 on a Cardan spring suspension 142'. The paddle is in the form of an elongated hollow member with its outer end adjacent wall 117 of the container sealed by a threaded cap 142a, and its inner end sealed by connection thereof to a central hollow oblong paddle mount 146. Mount 146 is symmetrically positioned at the center 147 of the spring suspension 142'. It will be seen that paddle 142 is, in effect, half a paddle which extends substantially from its mounting 147 at the center of the case radially outward to one wall section 117 of the instrument. The hollow portion 142b of the paddle 142 has a low mass in the liquid employed. Hence, as a practical matter it may be said that the paddle 142 is unbalanced essentially by the mass of the cap 142a at the outer end of the paddle. The paddle is almost completely buoyant in the liquid, and the small additional mass of cap 142a only slightly reduces such buoyancy, while aiding, along with the unsymmetrical characteristics of the paddle, in unbalancing the paddle sufficiently for purposes of this invention.

The oblong central portion 146 of the paddle carries insulating pins 144, and the blocks 143 mounted on island 141 carry insulating pins 145. Unbonded electrical strain wires 147' are stretched between 144 and 145 on each side of the paddle, said strain wires being connected in a conventional bridge circuit. It will be seen that rotation of paddle 142 due to angular and/or linear acceleration, as described above, will vary the resistance in the strain wires, and such change will be sensed by the bridge. The modification of FIG. 12 can thus also function as a combined linear and angular accelerometer.

From the foregoing it is seen that I have designed an instrument which will sense the arithmetic sum of the angular and linear accelerations imparted to the instrument, the instrument being of particular value in sensing the sum of a positive angular and a positive linear acceleration, that is, when both these acceleration forces cause the paddle to rotate in the same direction. It will be noted that in the zero position, the paddle is substantially undeflected on its hinge, although the paddle is unbalanced.

While I have described particular embodiments of my invention for the purpose of illustration, it should be understood that various modifications and adaptations thereof may be made within the spirit of the invention, as set forth in the appended claims.

I claim:

1. A combined angular and linear accelerometer, comprising a closed chamber, said chamber having opposing cylindrical wall portions, liquid in said chamber, a paddle of low mass, a hinge for said paddle, said hinge being mounted in said chamber and connected to said paddle, said paddle being rotatably mounted about said hinge on the axis of said cylinder, for limited angular motion of said paddle about the said axis, said paddle being unbalanced, with one side of said paddle beyond said hinge being of greater mass than the other side of said paddle, said paddle being substantially undeflected on its hinge in the zero position of the paddle, said paddle extending substantially from closely adjacent one wall portion of said chamber to a position spaced a substantial distance from the opposing wall and immersed in said liquid, the space between said one wall portion and said paddle defining an orifice, and the space between said opposing wall and the adjacent end of said paddle being sufficient so that the velocity of the liquid passing through said last-mentioned space is substantially less than the velocity of said liquid passing through said orifice on acceleration of said accelerometer, and motion sensing means connected to said paddle to sense the angular displacement of said paddle.

2. A combined angular and linear accelerometer, comprising a closed cylindrical chamber, said chamber having opposing cylindrical wall portions, liquid in said chamber, a paddle of low mass immersed in said liquid, a hinge for said paddle, said hinge being connected to said paddle, a mounting in said chamber for said hinge, said paddle being rotatably mounted about said hinge on the axis of said cylindrical chamber for limited angular motion of said paddle about the said axis, said paddle being unbalanced, with one portion of said paddle on one side of said hinge having a greater length than the other portion of said paddle on the other side of said hinge, said paddle being substantially undeflected on its hinge in the zero position of the paddle, said paddle being immersed in said liquid, one outer edge of said paddle being closely spaced from the adjacent cylindrical wall portion of the container and the other outer edge being positioned a substantial distance from the opposite wall of the container, the space between said one outer edge of said paddle and said wall portion defining an orifice, and the space between said other outer edge of said paddle and said opposite wall of said container being sufficient so that the velocity of the liquid passing through said last-mentioned space is substantially less than the velocity of said liquid passing through said orifice on acceleration of said accelerometer, and a motion sensing means connected to said paddle to sense the angular displacement of said paddle.

3. A combined angular and linear accelerometer as defined in claim 1, wherein said paddle is in the form of a hollow elongated member with its opposite ends sealed, and including a baffle disposed diametrically in said chamber in alignment with and adjacent said paddle.

4. A combined angular and linear accelerometer, comprising a closed cylindrical chamber, a liquid in said chamber, a paddle of low mass in said chamber immersed in said liquid, a mounting for said paddle fixedly mounted in said chamber, said paddle being positioned on said mounting for limited motion thereon, said paddle being unbalanced, with an outer edge of said paddle disposed closely adjacent, but out of contact with, an enclosing wall of said chamber, the separation between said outer edge of the paddle and said wall forming a fluid communicating passageway, the opposite edge of said paddle being spaced a substantial distance from the opposite wall, and the space between said opposite edge of said paddle and said opposite wall being sufficient so that the velocity of liquid passing through said space is substantially less than the velocity of said liquid passing through said passageway on acceleration of said accelerometer, a baffle disposed in said chamber in alignment with and adjacent said paddle, said paddle being substantially undeflected on its mounting in the zero position of the paddle, and means for sensing said motion.

5. A combined angular and linear accelerometer, comprising a closed cylindrical chamber, a liquid in said chamber, a paddle in said chamber immersed in said liquid, said paddle being in the form of a hollow member with sealed opposite ends, a mounting for said paddle fixedly mounted in said chamber, said paddle being positioned on said mounting for limited angular motion on said mounting, said paddle being movably mounted in said chamber with one paddle end portion of greater length than the other paddle end portion on opposite sides of said mounting, the outer edge of said one paddle end portion being disposed closely adjacent, but out of contact with, an enclosing wall of said chamber, the separation between said outer edge of the paddle and said wall forming a fluid communicating passageway, the outer edge of said other paddle end portion being spaced a substantial distance from the opposite wall, the space between the outer edge of said other paddle end portion and said opposite wall being sufficient so that the velocity of liquid passing through said space is substantially less than the velocity of said liquid passing through said passageway on acceleration of said accelerometer, said paddle being substantially undeflected on its mounting in the zero position of the paddle, and a motion sensing means connected to said paddle for sensing said angular motion.

6. A combined angular and linear accelerometer, comprising a closed cylindrical chamber, a liquid in said chamber, a paddle of low mass in said chamber immersed in said liquid, a mounting for said paddle fixedly mounted in said chamber, said paddle being movably mounted in said chamber and being unbalanced and of unequal length on opposite sides of said mounting, with one outer edge of said paddle disposed adjacent, but out of contact with, an enclosing wall of said chamber, the separation between said outer edge of the paddle and wall forming a fluid communicating passageway for fluid movement from one side of said paddle to the other side thereof, the other outer edge of said paddle being spaced substantially from the opposite wall of said chamber, the space between said other outer edge of said paddle and said chamber being sufficient so that the velocity of liquid passing through said space is substantially less than the velocity of said liquid passing through said passageway of acceleration of said accelerometer, said paddle having opposing surfaces immersed in said liquid, said paddle being positioned on said mounting for limited motion thereon, said unbalanced paddle being substantially undeflected on its mounting in the zero position of the paddle, a baffle, said baffle being disposed parallel to the axis of said paddle and spaced closely adjacent thereto to form fluid communicating passages between said paddle and said baffle, and means for sensing the motion of said paddle.

7. A combined angular and linear accelerometer, comprising a closed chamber, said chamber having opposing cylindrical wall portions, liquid in said chamber, a paddle of low mass, said paddle having a small additional weight added to one side of the paddle to unbalance it, a hinge for said paddle, said hinge being mounted in said chamber and connected to said paddle, said paddle being rotatably mounted about said hinge on the axis of said cylinder, for limited angular motion of said paddle about the said axis, a yieldable restraint for said paddle connected to said paddle and to the walls of said chamber, said paddle being substantially undeflected on its hinge by said additional weight in the zero position of the paddle, opposing edges of said paddle being adjacent the opposing cylindrical wall portions, and motion sensing means connected to said paddle to sense the angular displacement of said paddle.

8. A combined angular and linear accelerometer, comprising a closed chamber, said chamber having opposing cylindrical wall portions, liquid in said chamber, a paddle of low mass, said paddle having a small additional weight added to one side of the paddle to unbalance it, a hinge for said paddle, said hinge being mounted in said chamber and connected to said paddle, said paddle being rotatably mounted about said hinge on the axis of said cylinder, for limited angular motion of said paddle about the said axis, a yieldable restraint for said paddle connected to said paddle and to the walls of said chamber, said paddle being substantially undeflected on its hinge by said additional weight in the zero position of the paddle, said paddle extending from one wall to the opposing wall and immersed in said liquid, opposing edges of said paddle being adjacent and spaced from the opposing cylindrical wall portions, and motion sensing means connected to said paddle to sense the angular displacent of said paddle.

9. A combined angular and linear accelerometer, comprising a closed cylindrical chamber, said chamber having opposing cylindrical wall portions, liquid in said chamber, a substantially buoyant paddle of low mass, said paddle having a low weight when immersed in said liquid, said paddle having a small additional weight added to one side of the paddle to unbalance it, a hinge for said paddle, said hinge being connected to said paddle, a mounting in said chamber for said hinge, said paddle being rotatably mounted about said hinge on the axis of said cylindrical chamber for limited angular motion of said paddle about the said axis, a yieldable restraint for said paddle connected to said paddle and to the walls of said chamber, said paddle being substantially undeflected on its hinge by said additional weight in the zero position of the paddle, said paddle extending from one wall to the opposing wall and immersed in said liquid, opposing edges of said paddle being adjacent the opposing cylindrical walls, at least one edge of said paddle being closely spaced from the adjacent cylindrical wall of the container, baffles disposed closely adjacent the longitudinal edges of said paddle, and an electrical strain wire transducer connected to said paddle to sense the angular displacement of said paddle.

10. A combined angular and linear accelerometer, as defined in claim 1, wherein said paddle is in the form of a hollow elongated member with opposite ends each sealed by a cap, one of said caps being slightly heavier than the other of said caps, and including a baffle disposed diametrically in said chamber in alignment with and adjacent said paddle.

11. A combined angular and linear accelerometer, comprising a closed cylindrical chamber, said chamber having opposite cylindrical wall portions, liquid in said chamber, a paddle in the form of a hollow elongated member with sealed opposite ends, each sealed by a cap, one of said caps being slightly heavier than the other of said caps, a hinge for said paddle, a mounting in said chamber for said hinge, said paddle being rotatably mounted about said hinge on the axis of said cylindrical chamber for limited angular motion of said paddle about the said axis, a yieldable restraint for said paddle connected to said paddle and to the walls of said chamber, said paddle being substantially undeflected on its hinge by said heavier cap in the zero position of the paddle, opposing edges of said paddle lying closely adjacent the cylindrical wall of the container, a pair of baffles, one fixedly mounted above and the other fixedly mounted below said paddle, said baffles being disposed parallel to the axis of said paddle and spaced closely adjacent thereto, said baffles being substantially coextensive with said paddle, and an electrical strain wire transducer connected to said paddle to sense the angular displacement of said paddle.

12. A combined angular and linear accelerometer, comprising a closed cylindrical chamber, a liquid in said chamber, a paddle of low mass in said chamber immersed in said liquid, said paddle having a small additional weight added to one side of the paddle to unbalance it, said paddle having a low weight in said liquid, a mounting for said paddle fixedly mounted in said chamber, a yieldable constraint for said paddle, said paddle being movably mounted in said chamber with an edge of said paddle adjacent, but out of contact with, an enclosing wall of said chamber, the separation between the edge of the paddle and said wall forming a fluid communicating passageway, said paddle being positioned on said mounting for limited motion thereon, said paddle being substantially undeflected on its mounting by said additional weight in the zero position of the paddle, a baffle disposed in said chamber in alignment with and adjacent said paddle, and means for sensing said motion.

13. A combined angular and linear accelerometer, comprising a closed cylindrical chamber, a liquid in said chamber, a paddle in said chamber immersed in said liquid, said paddle being in the form of a hollow member with sealed opposite ends, each sealed by a cap, one of said caps being slightly heavier than the other of said caps, a mounting for said paddle fixedly mounted in said chamber, a yieldable constraint for said paddle, said paddle being moveably mounted in said chamber with an edge of said paddle adjacent, but out of contact with, an enclosing wall of said chamber, the separation between the edge of the paddle and said wall forming a fluid communicating passageway, said paddle being positioned on said mounting for limited angular motion on said mounting, said paddle being substantially undeflected on its mounting by said heavier cap in the zero position of the paddle, and an electrical strain wire transducer connected to said paddle for sensing said motion.

14. A combined angular and linear accelerometer, comprising a closed cylindrical chamber, a liquid in said chamber, a paddle of low mass in said chamber immersed in said liquid, said paddle having a small additional weight added to one side of the paddle to unbalance it, a mounting for said paddle fixedly mounted in said chamber, a yieldable constraint for said paddle, said paddle being movably mounted in said chamber with an edge of said paddle adjacent, but out of contact with, an enclosing wall of said chamber, the separation between the edge of the paddle and wall forming a fluid communicating passageway for fluid movement from one side of said paddle to the other side thereof, said paddle having opposing surfaces immersed in said liquid, said paddle being positioned on said mounting for limited motion thereon, said paddle being substantially undeflected on its mounting by said additional weight in the zero position of the paddle, baffles above and below said paddle, said baffles being disposed parallel to the axis of said paddle and spaced closely adjacent thereto to form fluid communicating passages between said paddle and said baffles, and means for sensing the motion of said paddle.

15. A motion sensing device, comprising a closed chamber, said chamber having opposing cylindrical wall portions, liquid in said chamber, a rigid substantially buoyant paddle of low mass, said paddle being in the form of a hollow cylinder along a major portion of the paddle, said paddle having sealed opposite ends, each sealed by a cap, one of said caps being slightly heavier than the other of said caps, a spring hinge for said paddle, a paddle mounting in said chamber positioned on said hinge, said paddle being rotatably mounted about said spring hinge on the axis of said cylinder for limited angular motion of said paddle about the said axis, said paddle being substantially undeflected on its hinge by said heavier cap in the zero position of the paddle, said paddle extending from one wall to the opposing wall and immersed in said liquid, opposing edges of said paddle being closely adjacent the opposing cylindrical wall portion, adjustably mounted baffles above and below said paddle, said baffles being disposed parallel to the axis of said paddle and spaced closely adjacent thereto, and an electrical strain wire transducer connected to said paddle to sense the angular displacement of said paddle.

No references cited.